United States Patent
Ortseifen et al.

(10) Patent No.: US 10,018,971 B2
(45) Date of Patent: Jul. 10, 2018

(54) CONTROLLER FOR CONTROLLING A MICROMECHANICAL ACTUATOR, IN PARTICULAR A MICROMIRROR, CONTROL SYSTEM, MICROMIRROR SYSTEM, AND METHOD FOR CONTROLLING A MICROMECHANICAL ACTUATOR

(71) Applicant: Robert Bosch GmbH, Stuttgart (DE)

(72) Inventors: Andreas Ortseifen, Eschweiler (DE); Mohamad Iyad Al Dibs, Pliezhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 36 days.

(21) Appl. No.: 15/423,789

(22) Filed: Feb. 3, 2017

(65) Prior Publication Data
US 2017/0242407 A1    Aug. 24, 2017

(30) Foreign Application Priority Data

Feb. 18, 2016   (DE) .......................... 10 2016 202 467

(51) Int. Cl.
  *H02P 31/00* (2006.01)
  *G05B 6/02* (2006.01)
(52) U.S. Cl.
  CPC .............. *G05B 6/02* (2013.01); *H02P 31/00* (2013.01)
(58) Field of Classification Search
  CPC ....................................... H02P 31/00
  USPC ...................................... 318/116, 34
  See application file for complete search history.

(56) References Cited

U.S. PATENT DOCUMENTS 9,241,731 B2 *   1/2016   Boudreaux .... A61B 17/320068

FOREIGN PATENT DOCUMENTS

DE         102013217102 A1     3/2015

* cited by examiner

*Primary Examiner* — David S Luo
(74) *Attorney, Agent, or Firm* — Norton Rose Fulbright US LLP; Gerard Messina

(57) ABSTRACT

A controller for controlling a micromechanical actuator having a setpoint input for receiving a setpoint signal, an actual-value input for receiving an actual-value signal, a setpoint filter to attenuate a first predefined frequency or a first predefined frequency band in the received setpoint signal to generate a filtered setpoint signal, a differentiator to generate a time derivative of the received actual-value signal; a controller core to generate a manipulated variable signal based on a system deviation between the filtered setpoint signal and the actual-value signal; a phase rotation element to modify the phase of the difference between the manipulated variable signal and the derivative of the actual-value signal for a second frequency or in a predefined second frequency band to generate a modified manipulated variable signal; and a first manipulated variable filter to suppress a predefined third frequency in the modified manipulated variable signal.

17 Claims, 4 Drawing Sheets

CONTROLLER FOR CONTROLLING A MICROMECHANICAL ACTUATOR, IN PARTICULAR A MICROMIRROR, CONTROL SYSTEM, MICROMIRROR SYSTEM, AND METHOD FOR CONTROLLING A MICROMECHANICAL ACTUATOR

CROSS REFERENCE

The present application claims the benefit under 35 U.S.C. § 119 of German Patent Application No. DE 102016202467.1 filed on Feb. 18, 2016, which is expressly incorporated herein by reference in its entirety.

FIELD

The present invention relates to a controller for controlling a micromechanical actuator, as well as to a method for controlling a micromechanical actuator.

BACKGROUND INFORMATION

German Patent Application No. DE 10 2013 217 102 A1 describes a micromirror system having a control system that includes such a controller, and a corresponding control method. The controller has a setpoint input for receiving a setpoint signal, as well as an actual-value input for receiving an actual-value signal. The received setpoint signal is filtered by a setpoint filter within a predefined first frequency band in order to generate a filtered setpoint signal. On the basis of the received actual-value signal, a differentiator generates a time derivative of the actual-value signal. A controller core is also provided that generates a manipulated variable signal for the micromechanical actuator on the basis of a system deviation between the filtered setpoint signal and the actual-value signal. The difference between the manipulated variable signal and the derivative of the actual-value signal is calculated, and the phase of this difference is modified within a predefined second frequency band to obtain a modified manipulated variable signal.

This controller can be used to adequately attenuate the unwanted excitation of a first resonant frequency of the micromechanical actuator. However, higher order resonances are only inadequately attenuated using the conventional controller, so that unwanted oscillations of the micromechanical actuator can occur. Against this background, it is an object of the present invention to reduce the excitation of higher order resonances with as little technical complexity as possible.

SUMMARY

In the case of an example controller according to the present invention, the example control system according to the present invention, and the example micromirror system according to the present invention, the objective may be achieved by a first manipulated variable filter that is designed to suppress a predefined third frequency in the modified manipulated variable signal in order to generate a filtered manipulated variable signal for the micromechanical actuator. To achieve the objective, the example method according to the present invention provides that a third frequency in the modified manipulated variable signal be suppressed in order to generate a filtered manipulated variable signal for the micromechanical actuator.

An advantage may be derived over the related art that such frequencies in the modified manipulated variable signal, which correspond to the resonant frequencies and/or the antiresonant frequencies of the micromechanical actuator, may be suppressed by using the first manipulated variable filter to properly select the first manipulated variable signal. The micromechanical actuator may be operated using a filtered manipulated variable signal. Thus, to the extent possible, the micromechanical actuator is prevented from being excited in a frequency band in which these resonant frequencies reside. There is no need to increase the bandwidth of the controller core to suppress the higher order resonant frequencies, making it possible to keep the necessary technical complexity to a minimum.

The first manipulated variable filter may have a transfer function $NO_1(s)$ that may be expressed as follows:

$$NO_1(s) = \frac{s^2 + (2\pi f_3)^2}{s^2 + \frac{2\pi f_3}{q}s + (2\pi f_3)^2} \quad \text{(Equation 1)}$$

where
$f_3$: fourth frequency
$q$: quality factor

The setpoint signal is preferably generated as a reference input variable that is present in the time domain. The actual-value signal may be generated as a controlled variable that is present in the time domain. The filtered manipulated variable signal may be fed to a control input of a micromechanical actuator. A position sensor is preferably provided that may be used to record a position of the actuator. The position sensor may generate an actual-value signal that is fed to the controller.

One preferred embodiment provides that the controller have a second manipulated variable filter that is designed for suppressing a predefined fourth frequency in the modified manipulated variable signal. Besides the third frequency, which is suppressed by the first manipulated variable filter, a further, fourth frequency in the modified manipulated variable signal may be attenuated by the second manipulated variable filter. A predefined fourth frequency in the manipulated variable signal is preferably suppressed in the method according to the present invention.

The second manipulated variable filter may have a transfer function $NO_2(s)$ that may be expressed as follows:

$$NO_2(s) = \frac{s^2 + (2\pi f_4)^2}{s^2 + \frac{2\pi f_4}{q}s + (2\pi f_4)^2} \quad \text{(Equation 2)}$$

where
$f_4$: fourth frequency
$q$: quality factor

In this connection, it is especially preferred if the first manipulated variable filter and the second manipulated variable filter be connected in series. In a series connection of the first manipulated variable filter with the second manipulated variable filter, a common transfer function NO (s) of the manipulated variable filters is derived that corresponds to the product of the transfer functions of both manipulated variable filters:

$$NO(s) = NO_1(s) \cdot NO_2(s) \quad \text{(Equation 3)}$$

An embodiment has proven to be advantageous whereby the predefined third frequency and the predefined fourth frequency are spaced apart by less than 10 kHz, preferably by less than 5 kHz, more preferably by less than 3 kHz. Such a small spacing of the third frequency from the fourth frequency permits overlapping of the frequency ranges within which the manipulated variable filters have an attenuating effect. The two manipulated variable filters may thereby form a common manipulated variable filter having an enlarged frequency range within which it is possible to suppress unwanted resonances of the micromechanical actuator.

The first manipulated variable filter and/or the second manipulated variable filter are preferably configured as notch filter(s). Notch filters are band-stop filters that feature a pronounced attenuation within a very narrow frequency band, in particular at exactly one frequency.

The setpoint filter may be designed as a notch filter, an FIR filter (finite impulse response filter), or as an IIR filter (infinite impulse response filter).

The controller core of the controller according to the present invention has the task of keeping the system deviation to a minimum. The controller core may be designed as a P controller, PD controller, PI controller or PID controller, for example. Alternatively, the controller core may be a third or higher order controller. The controller core may have one or a plurality of I elements, D elements, P elements, lead elements (phase-increasing elements), lag elements (phase-decreasing elements) or notch filter elements.

The phase rotating element is preferably designed to prevent the phase of the difference between the manipulated variable signal and the derivative of the actual-value signal from falling below a value of −180°, making it possible to maintain a sufficient phase reserve of the controller. The phase rotating element may be designed to convert a phase within the range of −180° to −360° to a phase within the range of 0° to −180°, for example. The phase rotating element preferably features a zeroth order transfer function.

The control system according to the present invention for controlling a micromechanical actuator has a signal generator for generating a setpoint signal. The control system also includes a first signal-conditioning unit for conditioning a manipulated variable signal for the micromechanical actuator and a second signal-conditioning unit for conditioning an actual-value signal. A controller as described above for controlling the micromechanical actuator may be used to generate the manipulated variable signal on the basis of the setpoint signal and the actual-value signal.

The micromirror system according to the present invention has at least one micromechanical actuator in the form of a micromirror, and an aforementioned control system.

Exemplary embodiments of the present invention are shown in the figures and explained in detail below.

DETAILED DESCRIPTION OF EXAMPLE EMBODIMENTS

Figure 1:
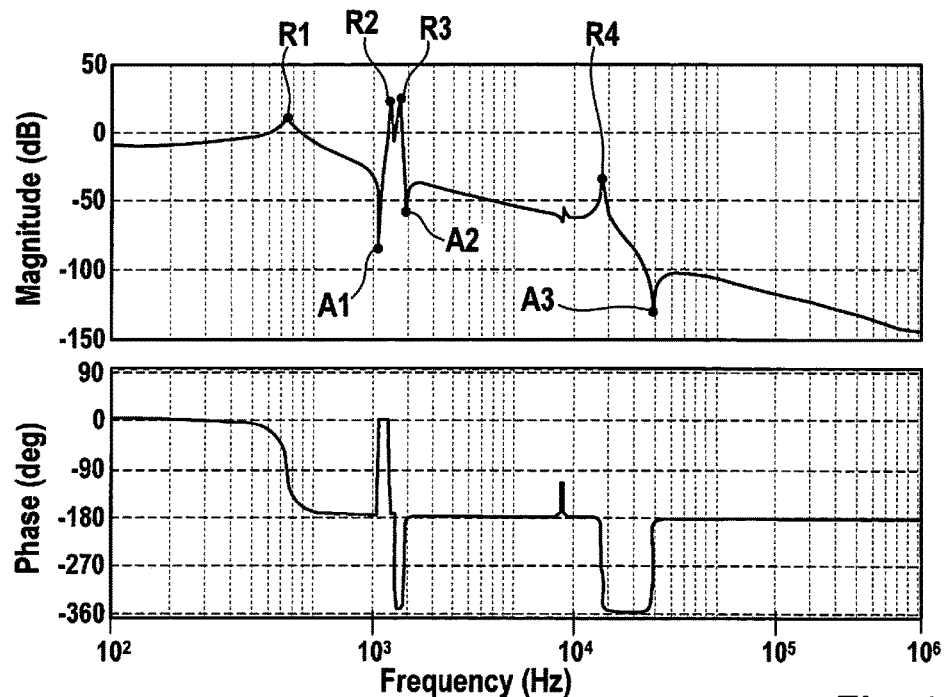
FIG. 1 shows a Bode plot of the transfer function of a micromechanical actuator.

In a Bode plot, FIG. 1 shows an exemplary transfer function of a micromechanical actuator 25 in the form of a micromirror that may be used as part of a microsystem 24 in a projection system. In the upper portion thereof, the Bode plot shows the amplitude response and, in the lower portion thereof, the phase response. The transfer function describes the ratio between the input signal of micromechanical actuator 25 and an output signal from a sensor that records the actual deflection of micromechanical actuator 25. From the Bode plot, it may be inferred that the transfer function of actuator 25 has a plurality of mechanical resonance points R1, R2, R3, R4. In particular, the transfer function includes a plurality of resonant frequencies where the amplitude response has a maximum in each case. In addition, a plurality of anti-resonance points A1, A2, A3 are discernible where the amplitude response has a minimum in each case. In this respect, micromechanical actuator 25 is oscillatory.

Figure 2:
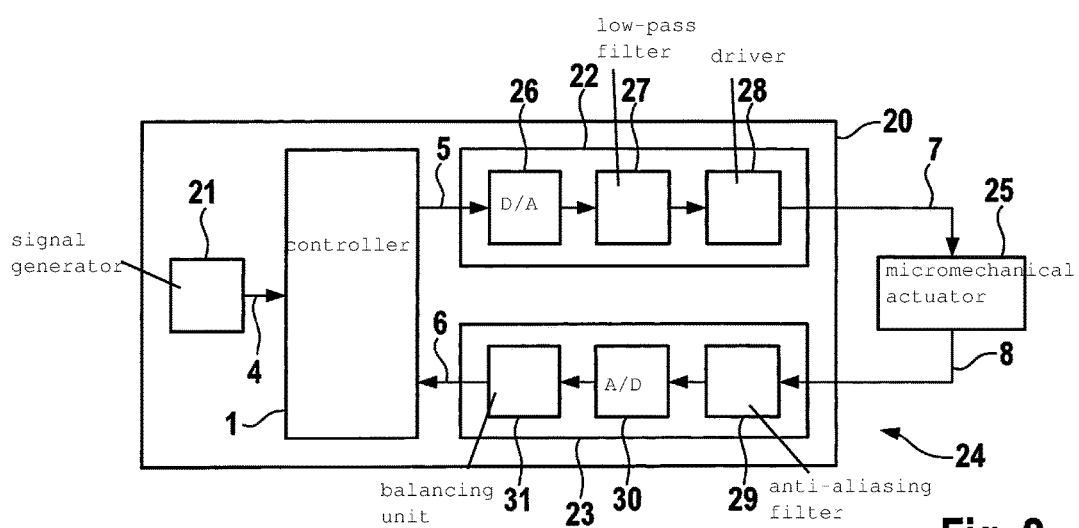
FIG. 2 shows a block diagram of an exemplary embodiment of the micromirror system according to the present invention.

FIG. 2 shows a block diagram of an exemplary micromirror system 24 that has a micromechanical actuator 25 of this kind. Micromechanical actuator 25 of micromirror system 24 is excited in a quasi-static operation with a fundamental frequency of approximately 60 Hz. To avoid mechanical resonances of actuator 25, the control system has a controller 1. A setpoint signal 4, which is generated by a signal generator 21, is fed to controller 1. Controller 1 generates a first manipulated variable signal 5 that is conditioned in a first signal-conditioning unit 22 and is fed as second manipulated variable signal 7 to micromechanical actuator 25. First signal-conditioning unit 22 includes a series circuit of a digital-to-analog converter 26, a low-pass filter 27 and a driver 28.

Micromechanical actuator 25 is in the form of a micromirror and has a detecting device (not specifically shown) for recording the deflection of micromechanical actuator 25. Detecting device provides a first actual-value signal 8. First actual-value signal 8 is conditioned in a second signal-conditioning unit 23 and is routed as a second actual-value signal 6 to controller 1. Second signal-conditioning unit 23 includes a series circuit of an anti-aliasing filter 29 having an analog-to-digital converter 30 and a balancing unit 31.

Figure 3:
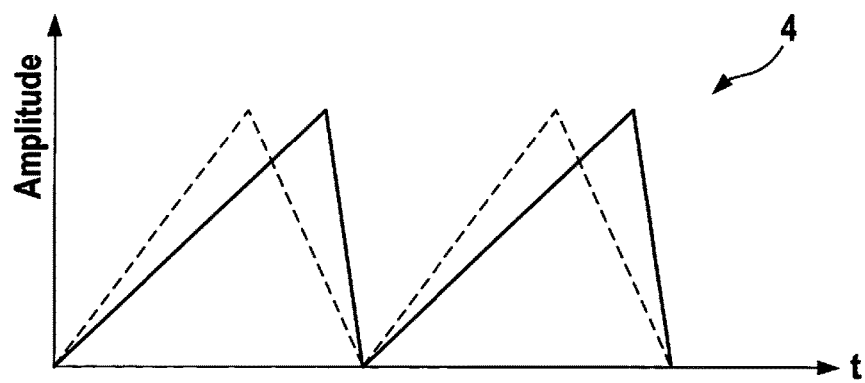
FIG. 3 shows a setpoint signal in the time domain.

FIG. 3 shows a plurality of exemplary waveforms of a setpoint signal 4 that is generated by signal generator 21. Setpoint signal 4 is a periodic sawtooth signal having a predefined fundamental frequency of approximately 60 Hz, allowing the micromirror system to generate a projection having an image refresh rate of approximately 60 images/sec.

Figure 4:
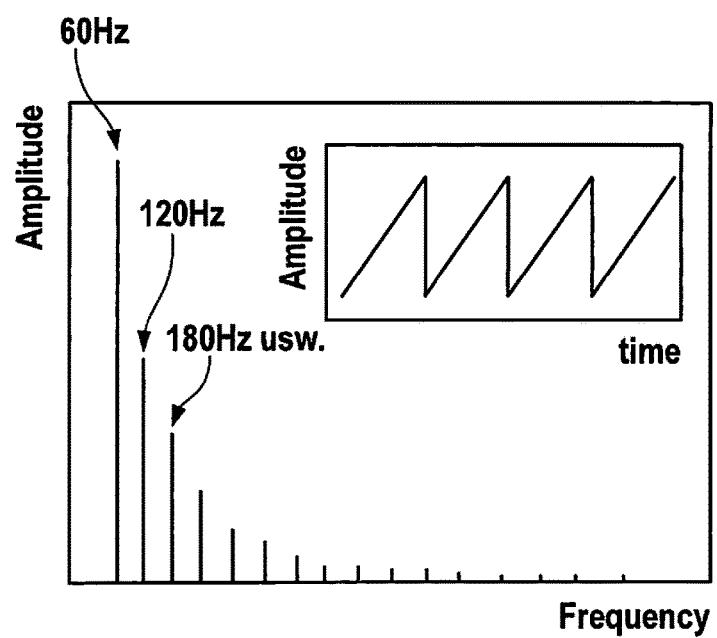
FIG. 4 shows a setpoint signal in the frequency domain.

FIG. 4 depicts a spectrum of setpoint signal 4. Besides the fundamental frequency of approximately 60 Hz, setpoint signal 4 additionally includes even and odd harmonic oscillations of the fundamental frequency, for example, at 120 Hz, 180 Hz, etc. The frequency components of these harmonic oscillations pose the risk that the previously described mechanical resonances of micromechanical actuator 25 may be excited at frequencies above the fundamental frequency of setpoint signal 4. Exciting these resonances may lead to faulty projections, for example, to unwanted light-dark patterns.

Figure 5:
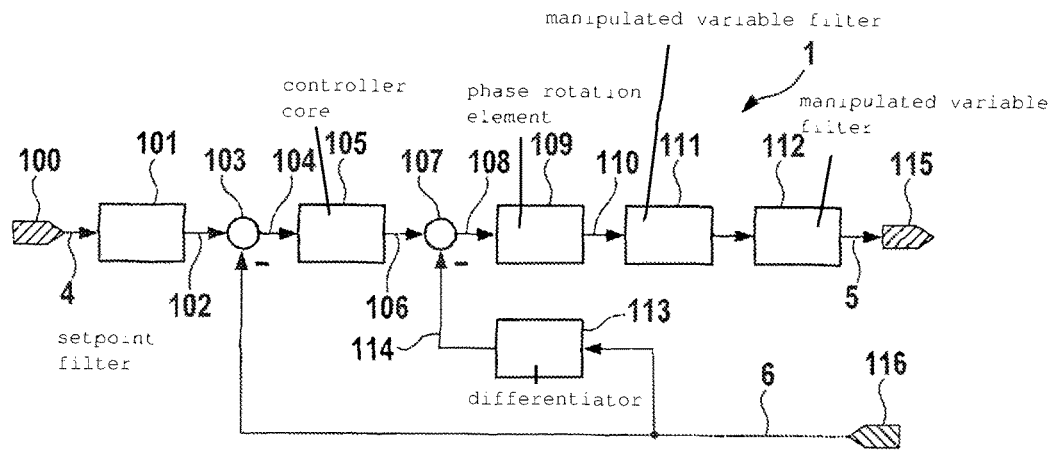
FIG. 5 shows a block diagram of an exemplary embodiment of the controller according to the present invention.

FIG. 5 shows a block diagram of an exemplary embodiment of controller 1 according to the present invention for controlling micromechanical actuator 25.

The controller has a setpoint input 100 for receiving setpoint signal 4. Setpoint signal 4 is fed to a setpoint filter 101 that is designed for attenuating a predefined frequency or a predefined frequency band in received setpoint signal 4 in order to generate a filtered setpoint signal 102. Setpoint filter is designed as an FIR filter, an IIR filter, or as a notch filter.

In addition, an actual-value input 116 is provided for receiving actual-value signal 6. Actual-value signal 6 is fed to a first subtractor circuit 103 which calculates the difference between filtered setpoint signal 102 and actual-value signal 116 that is referred to as system deviation 104. System deviation 104 is fed to a controller core 105 of controller 1 in the form of a PID controller, which, on the basis of system deviation 104, generates a manipulated variable signal 106.

The controller also has a differentiator 113, which calculates a time derivative 114 of received actual-value signal 6. Difference 108 between manipulated variable signal 106 and time derivative 114 of received actual-value signal 6 is calculated in a second comparator 107. This difference 108 is fed to a phase rotation element 109. Phase rotation element 109 is designed to modify the phase of difference 108 between manipulated variable signal 106 and derivative 114 of actual-value signal 6 for a second frequency or in a predefined second frequency band in order to generate a modified manipulated variable signal 110.

To prevent higher order resonances from being excited, modified manipulated variable signal 110 is fed to a series circuit of a first manipulated variable signal 111 and a second manipulated variable signal 112. Both manipulated variable filters 111, 112 are in the form of notch filters. First manipulated variable filter 111 suppresses a predefined third frequency in modified manipulated variable signal 110. Second manipulated variable filter 112 suppresses a predefined fourth frequency. In this respect, a filtered manipulated variable signal 5 for micromechanical actuator 25 is generated at a manipulated variable output 115.

First manipulated variable filter 111 and second manipulated variable filter 112 are dimensioned to space apart predefined third frequency $f_3$ and predefined fourth frequency $f_4$ by less than 10 kHz, preferably by less than 5 kHz, more preferably by less than 3 kHz.

Figure 6:
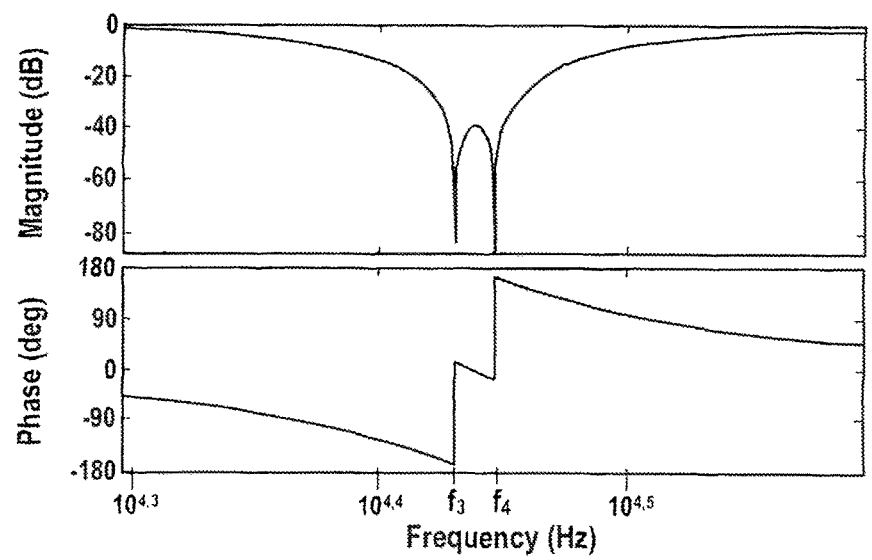
FIG. 6 shows a Bode plot of a series connection of two manipulated variable filters.

FIG. 6 shows a Bode plot of a series circuit of first manipulated variable filter 111 and second manipulated variable filter 112. The transfer function of this series circuit is derived by Equation 3. At third frequency $f_3$ and fourth frequency $f_4$, the series circuit has a high attenuation. Within the range between third frequency $f_3$ and fourth frequency $f_4$, the amplitude response has an attenuation of approximately 40 dB, allowing frequencies in the frequency band between third frequency $f_3$ and fourth frequency $f_4$ to be suppressed.

Figure 7:
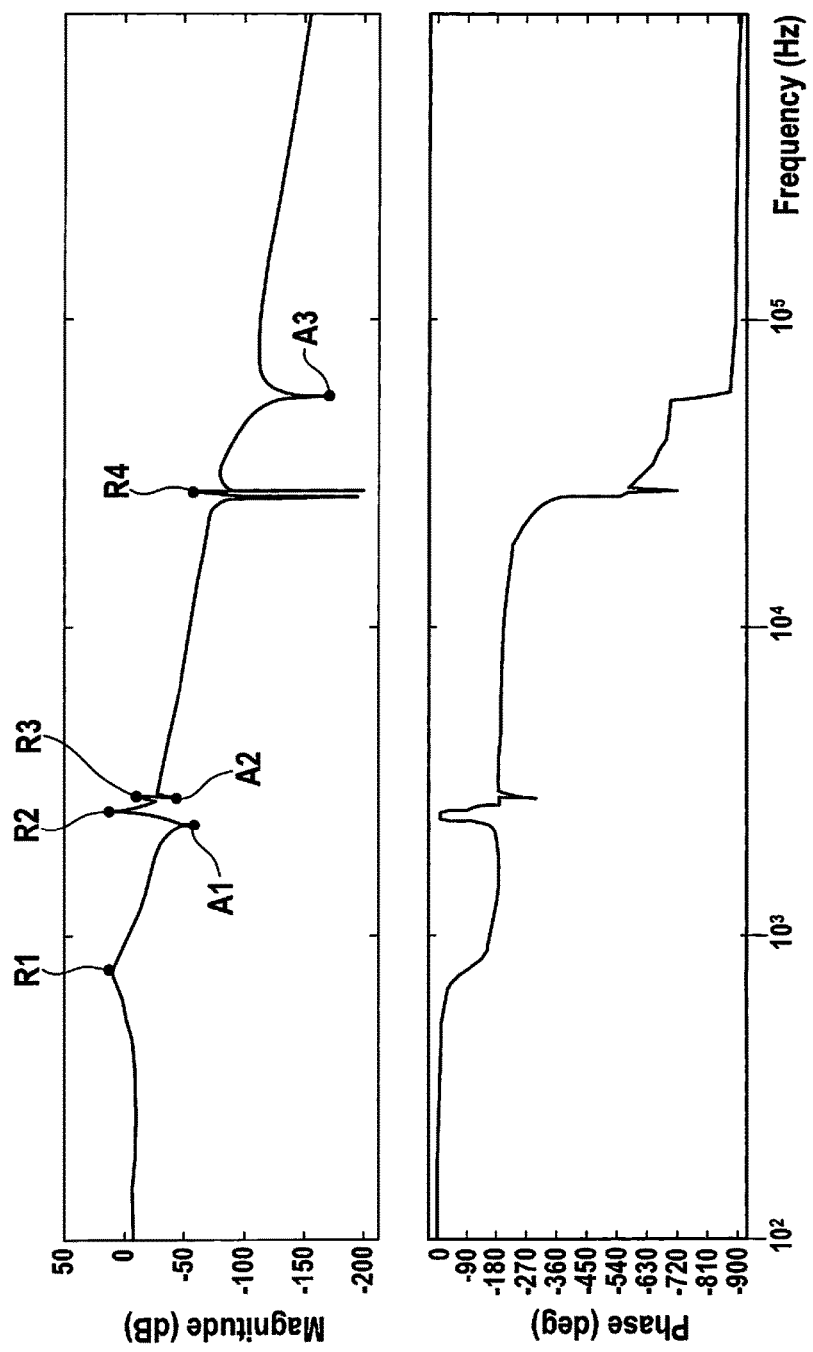
FIG. 7 shows a Bode plot of a series connection of two manipulated variable filters and of a micromechanical actuator.

FIG. 7 shows a Bode plot of a series circuit of first manipulated variable filter 111 and second manipulated variable filter 112 and micromechanical actuator 25. In comparison to the Bode plot of actuator 25 shown in FIG. 1, it is discernible that resonance point R4 is attenuated by the series circuit of first manipulated variable filter 111 and second manipulated variable filter 112.

What is claimed is:

1. A controller for controlling a micromechanical actuator, comprising:
a setpoint input to receive a setpoint signal;
an actual-value input to receive an actual-value signal;
a setpoint filter designed to attenuate a first predefined frequency or a first predefined frequency band in the received setpoint signal to generate a filtered setpoint signal;
a differentiator designed to generate a time derivative of the received actual-value signal;
a controller core that generates a manipulated variable signal for the micromechanical actuator based on a system deviation between the filtered setpoint signal and the actual-value signal;
a phase rotation element designed to modify a phase of the difference between the manipulated variable signal and the derivative of actual-value signal for a second frequency or in a predefined second frequency band to generate a modified manipulated variable signal; and
a first manipulated variable filter designed to suppress a predefined third frequency in the modified manipulated variable signal to generate a filtered manipulated variable signal for the micromechanical actuator.

2. The controller as recited in claim 1, wherein the micromechanical actuator is a micromirror.

3. The controller as recited in claim 1, further comprising:
a second manipulated variable filter designed to suppress a predefined fourth frequency in the modified manipulated variable signal.

4. The controller as recited in claim 3, wherein the first manipulated variable filter and the second manipulated variable filter are connected in series.

5. The controller as recited in claim 3, wherein the predefined third frequency and the predefined fourth frequency are spaced apart by less than 10 kHz.

6. The controller as recited in claim 3, wherein the predefined third frequency and the predefined fourth frequency are spaced apart by less than 5 kHz.

7. The controller as recited in claim 3, wherein the predefined third frequency and the predefined fourth frequency are spaced apart by less than 3 kHz.

8. The controller as recited in claim 3, wherein at least one of the first manipulated variable filter and the second manipulated variable filter is a notch filters.

9. A control system for controlling a micromechanical actuator, comprising:
a signal generator to generate a setpoint signal;
a first signal-conditioning unit to condition a manipulated variable signal for the micromechanical actuator;
a second signal-conditioning unit to condition an actual-value signal; and
a controller to control the micromechanical actuator including a setpoint input to receive the setpoint signal, an actual-value input to receive the actual-value signal, a setpoint filter designed to attenuate a first predefined frequency or a first predefined frequency band in the received setpoint signal to generate a filtered setpoint signal, a differentiator designed to generate a time derivative of the received actual-value signal, a controller core that generates a manipulated variable signal for the micromechanical actuator based on a system deviation between the filtered setpoint signal and the actual-value signal, a phase rotation element designed to modify a phase of the difference between the manipulated variable signal and the derivative of actual-value signal for a second frequency or in a predefined second frequency band to generate a modified manipulated variable signal, and a first manipulated variable filter designed to suppress a predefined third frequency in the modified manipulated variable signal to generate a filtered manipulated variable signal for the micromechanical actuator.

10. The control system as recited in claim 9, wherein the micromechanical actuator is a micromirror.

11. A micromirror system, comprising:
a micromechanical actuator in the form of a micromirror; and
a control system for controlling the micromechanical actuator, the control system including a signal generator to generate a setpoint signal, a first signal-conditioning unit to condition a manipulated variable signal for the micromechanical actuator, a second signal-conditioning unit to condition an actual-value signal, and a controller to control the micromechanical actuator, the controller including a setpoint input to receive the setpoint signal, an actual-value input to receive the actual-value signal, a setpoint filter designed to attenuate a first predefined frequency or a first predefined frequency band in the received setpoint signal to generate a filtered setpoint signal, a differentiator designed to generate a time derivative of the received actual-value signal, a controller core that generates a manipulated variable signal for the micromechanical actuator based on a system deviation between the filtered setpoint signal and the actual-value signal, a phase rotation element designed to modify a phase of the difference between the manipulated variable signal and the derivative of actual-value signal for a second frequency or in a predefined second frequency band to generate a modified manipulated variable signal, and a first manipulated variable filter designed to suppress a predefined third frequency in the modified manipulated variable signal to generate a filtered manipulated variable signal for the micromechanical actuator.

12. A method for controlling a micromechanical actuator, comprising:
receiving a setpoint signal;
receiving an actual-value signal;
attenuating a predefined first frequency or a predefined first frequency band in the received setpoint signal to generate a filtered setpoint signal;
generating a time derivative of the received actual-value signal;
generating a manipulated variable signal for the micromechanical actuator based on a system deviation between the filtered setpoint signal and the actual-value signal;
modifying a phase of a difference between the manipulated variable signal and the time derivative of the actual-value signal in the case of a predefined second frequency to generate a modified manipulated variable signal; and
suppressing a third frequency in the modified manipulated variable signal to generate a filtered manipulated variable signal for the micromechanical actuator.

13. The method as recited in claim 12, wherein in micromechanical actuator is a micromirror.

14. The method as recited in claim 12, wherein a predefined fourth frequency in the modified manipulated variable signal is suppressed.

15. The method as recited in claim 14, wherein the predefined third frequency and the predefined fourth frequency are spaced apart by less than 10 kHz.

16. The method as recited in claim 14, wherein the predefined third frequency and the predefined fourth frequency are spaced apart by less than 5 kHz.

17. The method as recited in claim 14, wherein the predefined third frequency and the predefined fourth frequency are spaced apart by less than 3 kHz.

* * * * *